July 15, 1924.
I. A. PARRY
BREAD RAISER
Filed April 26, 1922
1,501,231
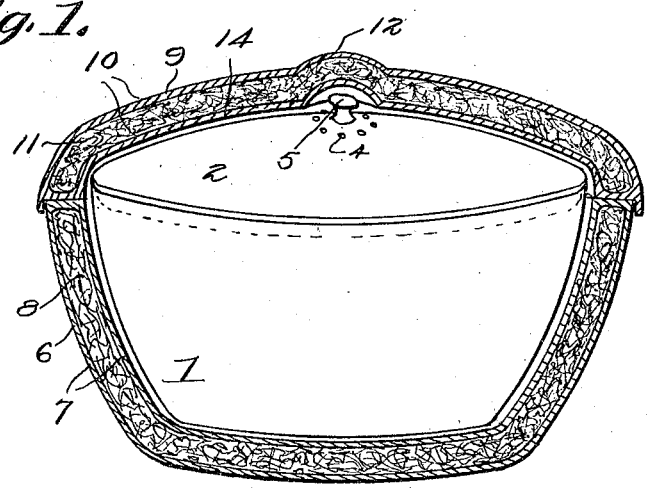
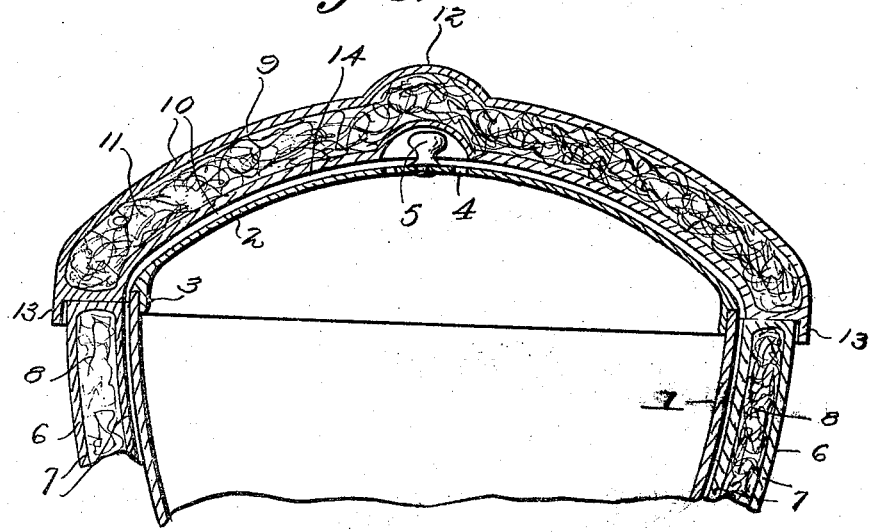
Inventor
I. A. Parry.
By
Attorney Patented July 15, 1924.

1,501,231

UNITED STATES PATENT OFFICE.

IRENE A. PARRY, OF SEATTLE, WASHINGTON.

BREAD RAISER.

Application filed April 26, 1922. Serial No. 556,768.

*To all whom it may concern:*

Be it known that IRENE A. PARRY, citizen of Great Britain, residing at Seattle, in the county of King and State of Washington, has invented certain new and useful Improvements in a Bread Raiser, of which the following is a specification.

This invention is directed to a container primarily for use in bread raising, wherein the dough during the leavening operation is protected from any appreciable temperature change, in order that the leavening operation can be perfected under most desirable conditions.

The invention comprises a container in which the dough, otherwise completely prepared, is placed for "rising." This container is provided with a cover adapted to close the container except for the provision of openings for the escape of gases formed during the leavening operation. A protective vessel is constructed to provide a heat insulating wall, and shaped to more or less accurately receive the container, the vessel having a cover adapted for a more or less loose fit, and normally spaced from the top of the container when the parts are in applied positions.

The invention is illustrated in the accompanying drawings in which:

Fig. 1 is a perspective view of the container, with the outer vessel and cover therefor in section.

Fig. 2 is an enlarged, broken, vertical section of the complete structure.

In the drawings, 1 represents the dough container, such for example, as a sheet metal vessel of appropriate dimensions. A cover 2 is provided for the container 1, said cover having a flange 3 to adapt the cover for snug connection with the container proper, and being formed at substantially the highest point with openings or vents 4, adjacent a handle 5.

The outer vessel comprises a body 6, formed of spaced walls 7, between which is an insulating packing, as asbestos, mineral wool, or the like, this packing 8 filling the space between the walls. The outer vessel is provided with a cover, as 9, also made up of spaced walls 10, with an intermediate insulating packing 11. This cover 9 is provided with a handle 12, and an edge flange 13, adapted to loosely embrace the upper edge of the body of the vessel, as shown in Fig. 2. The formation of the cover 9 is such that there is an appreciable space between the inner wall of said cover and the outer surface of the cover 2 of the dough container 1. This space, indicated at 14, provides for the escape of gases and the like rising thru the vents 4, the edge fitting of the cover 9 being sufficiently loose to permit venting these gases to the atmosphere.

In use, the dough with suitable leaven, is placed in the dough container 1, the cover 2 of the latter applied, and the dough container placed in the outer vessel. The mass is now allowed to remain for the appropriate period, being protected at this time against disadvantageous atmospheric changes thru the insulated outer vessel, and following this period, the dough will be found to have risen without any scalding or chilling.

Claims:

The combination with a dough container, including a vessel, a cover having a flange to engage and seal the edge of the vessel, said cover being formed in the extreme upper portion with vents, and an outer vessel of substantially the shape of the container and cover, said outer vessel comprising a body portion of spaced walls with a heat insulating packing therebetween, and a closure for said outer vessel of spacer parallel walls with a heat insulating packing therebetween, the closure for the outer vessel when applied to the body portion thereof being held above the cover of the container to provide a space between said cover and inner wall of the closure leading from the vents in the cover to the juncture of the closure and body of the outer vessel, whereby to permit gases accumulating in the container to escape at the juncture between the closure and body of the outer vessel.

In testimony whereof I affix my signature.

(MRS.) IRENE A. PARRY.